US008054261B2

(12) United States Patent
Pak et al.

(10) Patent No.: US 8,054,261 B2
(45) Date of Patent: Nov. 8, 2011

(54) LIQUID CRYSTAL DISPLAY AND METHOD THEREOF

(75) Inventors: Sang Jin Pak, Yongin-si (KR); Joo Hyung Lee, Gwacheon-si (KR); Myung Woo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1366 days.

(21) Appl. No.: 11/536,017

(22) Filed: Sep. 28, 2006

(65) Prior Publication Data

US 2007/0091013 A1    Apr. 26, 2007

(30) Foreign Application Priority Data

Oct. 26, 2005   (KR) .......................... 10-2005-0101378

(51) Int. Cl.
*G09G 3/36* (2006.01)
(52) U.S. Cl. ............................ 345/87; 345/173; 345/104
(58) Field of Classification Search .................... 345/87, 345/173, 104
See application file for complete search history.

(56) References Cited

U.S. PATENT DOCUMENTS

| | | | | |
|---|---|---|---|---|
| 5,194,862 | A | * | 3/1993 | Edwards .......................... 341/20 |
| 7,379,054 | B2 | * | 5/2008 | Lee ................................ 345/173 |
| 2001/0043291 | A1 | * | 11/2001 | Kono et al. ...................... 349/12 |
| 2003/0043122 | A1 | * | 3/2003 | Suzuki .......................... 345/173 |
| 2004/0150629 | A1 | | 8/2004 | Lee |
| 2005/0162410 | A1 | * | 7/2005 | Johnson et al. ............... 345/174 |

FOREIGN PATENT DOCUMENTS

| | | |
|---|---|---|
| JP | 05281516 | 10/1993 |
| JP | 07036017 | 2/1995 |
| JP | 07114364 | 5/1995 |
| JP | 08106358 | 4/1996 |
| JP | 09113867 | 5/1997 |
| JP | 2000-066837 | * 3/2000 |
| JP | 2000066837 | 3/2000 |
| JP | 2001100916 | 4/2001 |
| JP | 2003162374 | 6/2003 |
| JP | 2005018088 | 1/2005 |
| KR | 100226812 | 7/1999 |
| KR | 1020050042917 A | 5/2005 |

* cited by examiner

*Primary Examiner* — Richard Hjerpe
*Assistant Examiner* — Leonid Shapiro
(74) *Attorney, Agent, or Firm* — Cantor Colburn LLP

(57) ABSTRACT

A liquid crystal display includes a first panel, a second panel facing and separated from the first panel, a liquid crystal layer interposed between the first and second panels, a plurality of sensor data lines formed on the second panel, a plurality of variable capacitors of which capacitance thereof is varied by pressure, the variable capacitors connected to the sensor data lines, a plurality of reference capacitors connected to the sensor data lines, and first reset transistors and second reset transistors connected to the sensor data lines and supplying a first reset voltage and a second reset voltage to the sensor data lines at different times, respectively.

16 Claims, 11 Drawing Sheets under 35 U.S.C.§119
LIQUID CRYSTAL DISPLAY AND METHOD THEREOF

The present application claims priority to Korean Patent Application No. 10-2005-0101378, filed on Oct. 26, 2005, and all the benefits accruing therefrom under 35 U.S.C.§119, and the contents of which in its entirety are herein incorporated by reference.

BACKGROUND OF THE INVENTION (a) Field of the Invention

The present invention relates generally to a liquid crystal display ("LCD") and a method thereof. More particularly, the present invention relates to an LCD having sensing units detecting touch position and a method of detecting touch position using the sensing units.

(b) Description of the Related Art

Liquid crystal displays ("LCDs") typically include a pair of panels that are provided with pixel electrodes and a common electrode, as well as a liquid crystal layer with dielectric anisotropy interposed between the two panels. The pixel electrodes are typically arranged in a matrix pattern and are connected to switching elements, such as thin film transistors ("TFTs"), such that they receive image data voltages row by row. The common electrode covers the entire surface of one of the two panels and is supplied with a common voltage. A pixel electrode and corresponding portions of the common electrode and corresponding portions of the liquid crystal layer form a liquid crystal capacitor that, along with a switching element connected thereto, is a basic element of a pixel.

An LCD generates electric fields by applying voltages to the pixel electrodes and the common electrode, and the strength of the electric fields applied thereto are varied in order to adjust the transmittance of light passing through the liquid crystal layer, thereby displaying images.

Touch screen panels write or draw letters or pictures by touching a finger, a touch pen, or a stylus to a display panel or carry out desired operations of machines such as computers, etc., by operating icons. LCDs attached to the touch screen panels determine whether touch is made with the display panel (e.g., via a finger, the touch pen, etc.) and, if so, a corresponding touch position. While these panels provide certain advantages, the manufacturing costs of the LCDs that incorporate touch screen panels are high compared to the costs of LCDs that do not employ touch screen panels. Furthermore, the process used in attaching the touch screen panel to the LCD causes a reduction in the yield and the luminance of the LCD, as well as an increase in the thickness of the LCD.

For solving the above problems, a plurality of photo sensing units, which are implemented with thin film transistors, may be integrated into pixels displaying images of the LCD. The photo sensing unit senses the variation of light incident upon the display panel by a touch of the finger or an implement of a user, to determine whether there has been touch with the display panel and a touch position.

However, these photo sensing units are influenced by characteristics such as intensity of external light, intensity of light from a back light unit included in the LCD, and temperature, thereby resulting in a decrease in the accuracy of a corresponding sensing operation.

BRIEF SUMMARY OF THE INVENTION

The present invention solves the problems of the conventional techniques described above.

In exemplary embodiments of the preset invention, a liquid crystal display ("LCD") includes a first panel, a second panel facing and separated from the first panel, a liquid crystal layer interposed between the first and second panels, a plurality of sensor data lines formed on the second panel, a plurality of variable capacitors of which capacitance thereof is varied by pressure, the variable capacitors connected to the sensor data lines, a plurality of reference capacitors connected to the sensor data lines, and first reset transistors and second reset transistors connected to the sensor data lines and supplying a first reset voltage and a second reset voltage to the sensor data lines at different times, respectively.

The LCD may further include a plurality of output transistors connected to the sensor data lines and generating output signals based on sensor data signals flowing through the sensor data lines. The output transistors may be disposed on a periphery area of the second panel.

The LCD may further include a sensing signal processor supplied with the output signals from the output transistors and generating sensing signals based on the output signals. The sensing signal processor may further include integrators integrating the output signals to generate the sensing signals. The integrators may include amplifiers and capacitors.

The LCD may further include current sources connected to the output transistors and the sensing signal processor, and the current sources each flowing a constant current. The current sources may include thin film transistors ("TFTs") flowing the constant current while the sensing signal processor generates the sensing signals.

The first reset transistors may apply the first reset voltage to the sensor data lines before the sensing signal processor generates the sensing signals. The second reset transistors may apply the second reset voltage to the sensor data lines after the sensing signal processor generates the sensing signals. The first reset transistors and the second reset transistors may be formed on a periphery area of the second panel.

The variable capacitors may include first capacitance electrodes formed on the first panel and second capacitance electrodes formed on the second panel, and the sensor data lines function as the second capacitance electrodes. A distance between the first capacitance electrode and the second capacitance electrode for each variable capacitor may be varied by pressure and the capacitance of each variable capacitor may be varied based on a distance variation.

The reference capacitors may be supplied with a reference voltage. The first capacitance electrodes may be supplied with a common voltage swinging between a first level and a second level.

The sensing signal processor may generate the sensing signals in a porch period between frames. The sensing signal processor may generate the sensing signals within a predetermined time after the first reset transistors are turned off. The common voltage may maintain one of the first level and the second level for the predetermined time. The predetermined time may be at least about 1 H.

The sensor data lines may include a plurality of first and second sensor data lines extending in directions different from each other, respectively.

In other exemplary embodiments of the preset invention, an LCD includes a first panel, a second panel facing and separated from the first panel, a liquid crystal layer interposed between the first and second panels, a plurality of sensor data lines formed on the second panel, a plurality of variable capacitors of which capacitance thereof is varied by pressure, the variable capacitors connected to the sensor data lines, a plurality of reference capacitors connected to the sensor data lines, a plurality of output transistors connected to the sensor data lines and generating output signals based on sensor data signals flowing through the sensor data lines, and a plurality of current sources connected to the output transistors and flowing a constant current.

The LCD may further include a sensing signal processor connected to the output transistors and the current sources and generating sensing signals based on the output signals and the constant current. The current sources may include TFTs flowing the constant current while the sensing signal processor generates the sensing signals.

The LCD may further include reset transistors connected to the sensor data lines and applying a reset signal to the sensor data lines. At least one of the output transistors, the TFTs, and the reset transistors may be formed in a periphery area of the second panel.

In other exemplary embodiments of the present invention, a method of processing a sensing signal based on a pressure applied to a point of a liquid crystal panel, the liquid crystal panel including a first panel receiving a common voltage and a second panel having a plurality of sensor lines, includes applying a gate-on voltage of a reset signal to one of the sensor lines during a period when the common voltage has a first level, applying a switching signal to a switch of a sensing signal processor when a gate-off voltage of the reset signal is applied to the one of the sensor lines and during a period when the common voltage has a second level, and reading a sensing signal from an integrator in the sensing signal processor before the common voltage returns to the first level.

In other exemplary embodiments of the preset invention, an LCD includes a first panel, a second panel facing and separated from the first panel, a liquid crystal layer interposed between the first and second panels, a sensor data line formed on the second panel, a switch including a common electrode of the first panel and the sensor data line of the second panel as two terminals, a reset transistor connected to a first end of the sensor data line and supplying a reset voltage to the sensor data line, an output transistor connected to a second end of the sensor data line and generating an output signal based on a sensor data signal flowing through the sensor data line, and a sensing signal processor connected to the output transistor and generating a sensing signal based on the output signal.

BRIEF DESCRIPTION OF THE DRAWINGS

The present invention will become more apparent by further describing exemplary embodiments thereof with reference to the accompanying drawings, in which.

DETAILED DESCRIPTION OF THE INVENTION

Figure 1:
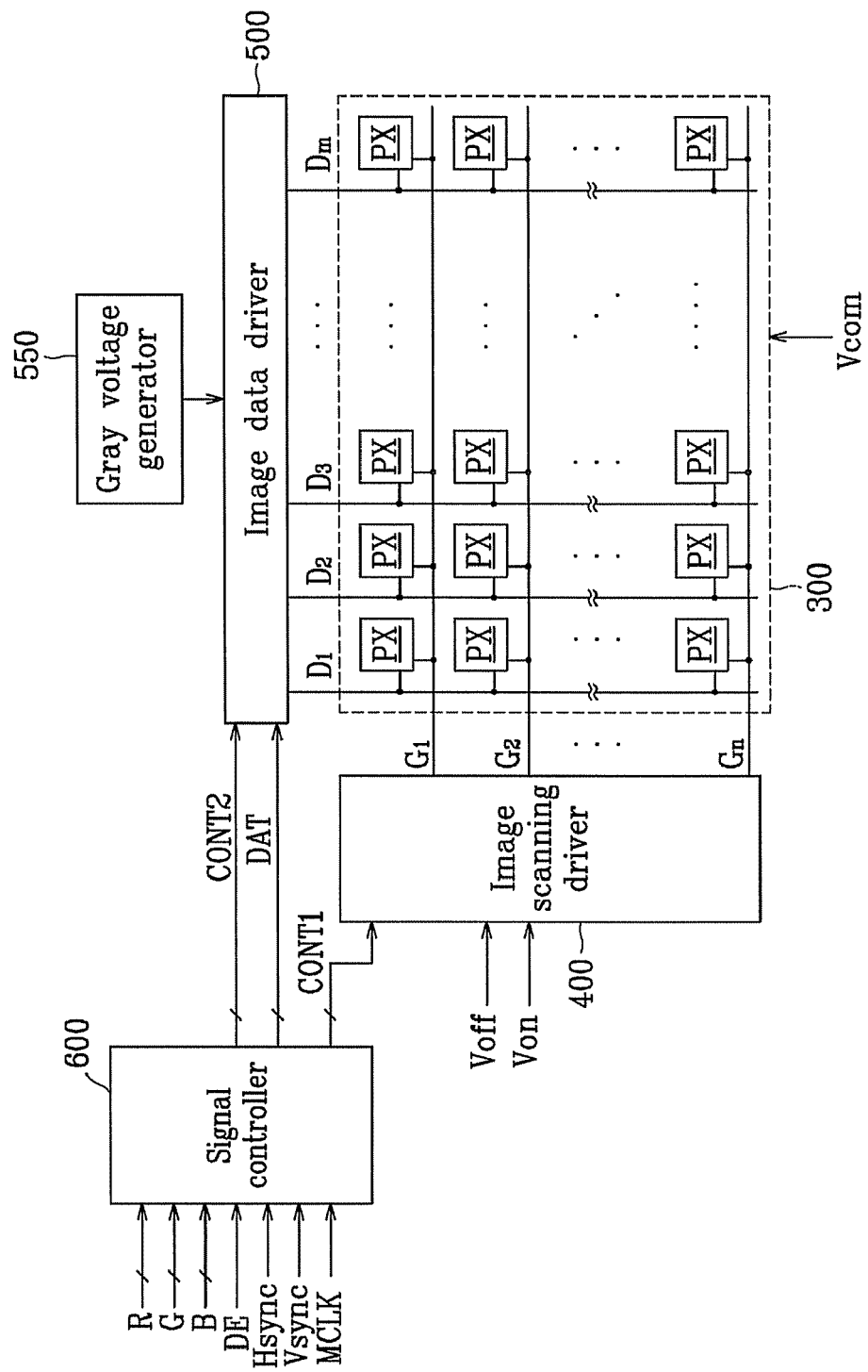
FIG. 1 is a block diagram of an exemplary LCD showing pixels according to an exemplary embodiment of the present invention.

The present invention will be described more fully hereinafter with reference to the accompanying drawings, in which exemplary embodiments of the present invention are shown. This invention may, however, be embodied in many different forms and should not be construed as limited to the exemplary embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising" or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An LCD according to exemplary embodiments of the present invention will now be described with reference to FIGS. 1 through 5.

Figure 2:
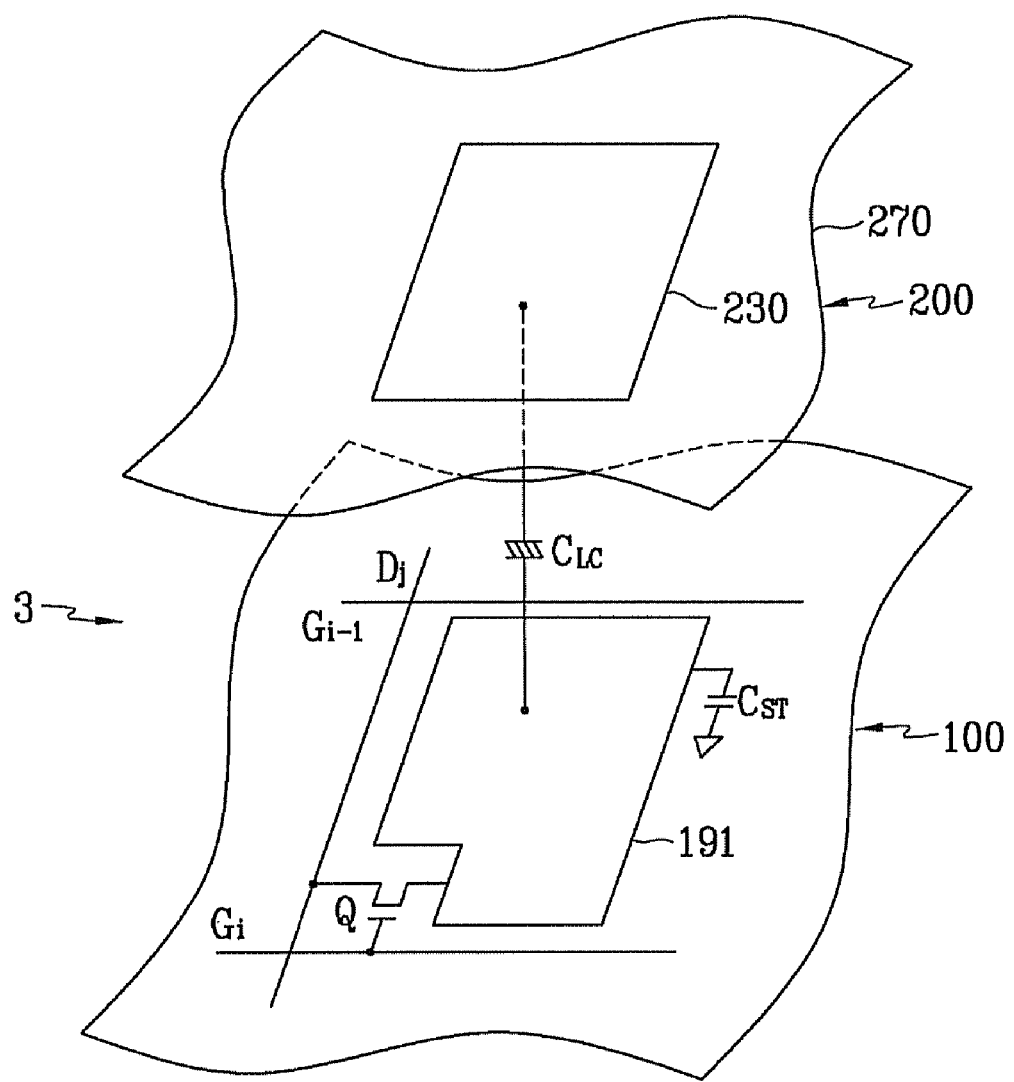
FIG. 2 is an equivalent circuit diagram of an exemplary pixel of an exemplary LCD according to an exemplary embodiment of the present invention.
Figure 3:
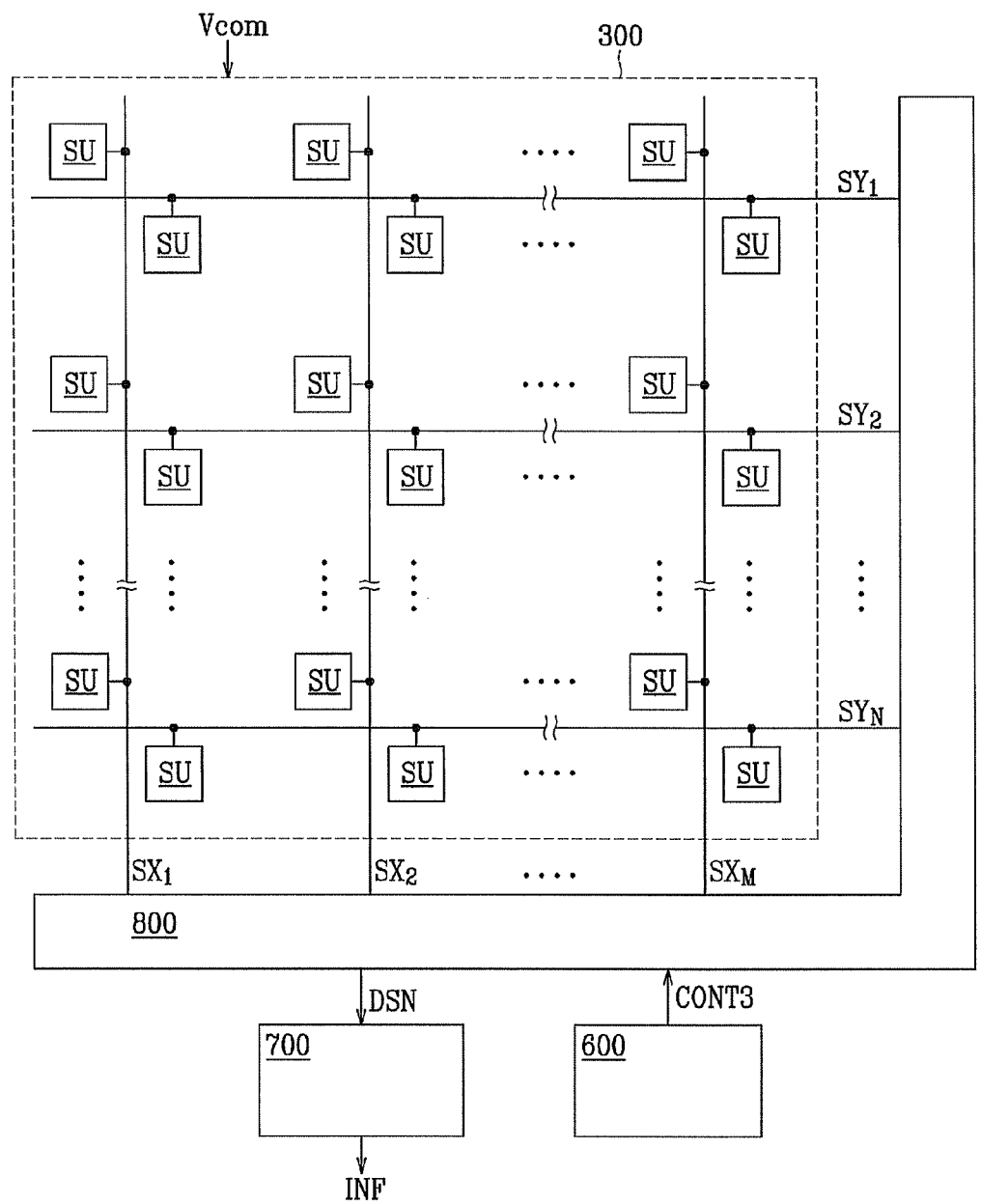
FIG. 3 is a block diagram of an exemplary LCD showing exemplary sensing units according to an exemplary embodiment of the present invention.
Figure 4A:
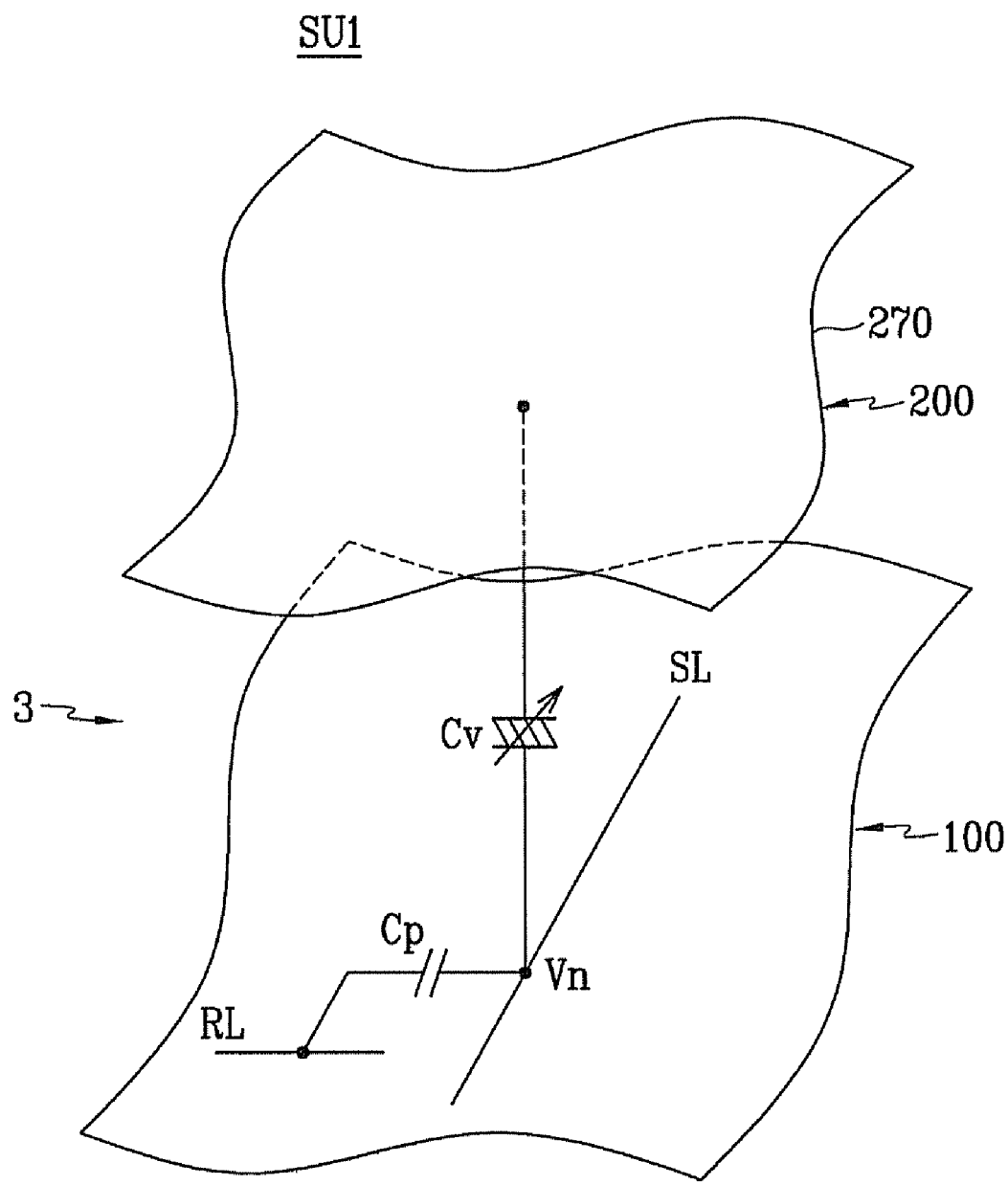
FIGS. 4A and 4B are equivalent circuit diagrams of exemplary sensing units of exemplary LCDs according to exemplary embodiments of the present invention, respectively.
Figure 4B:
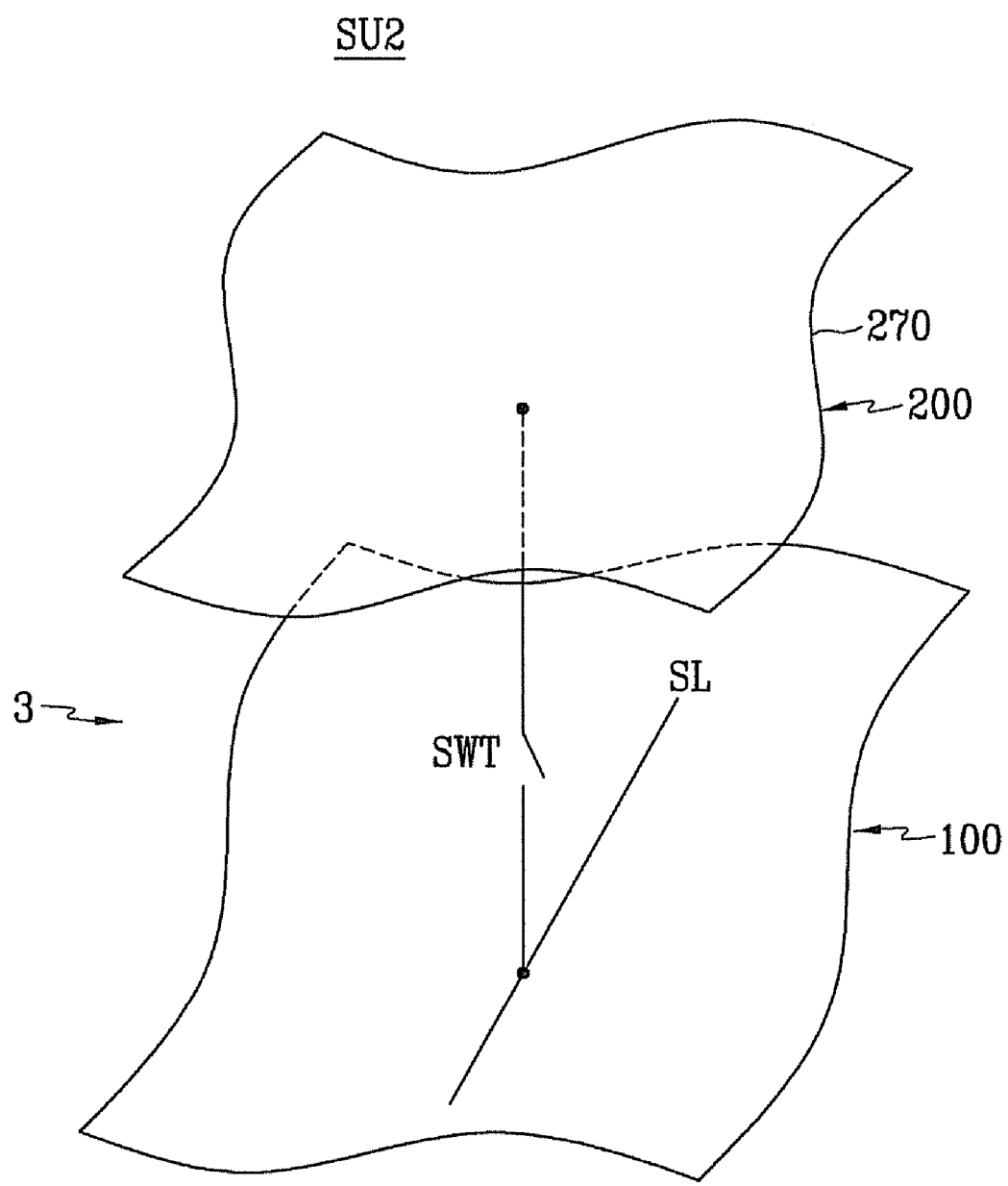
Figure 5:
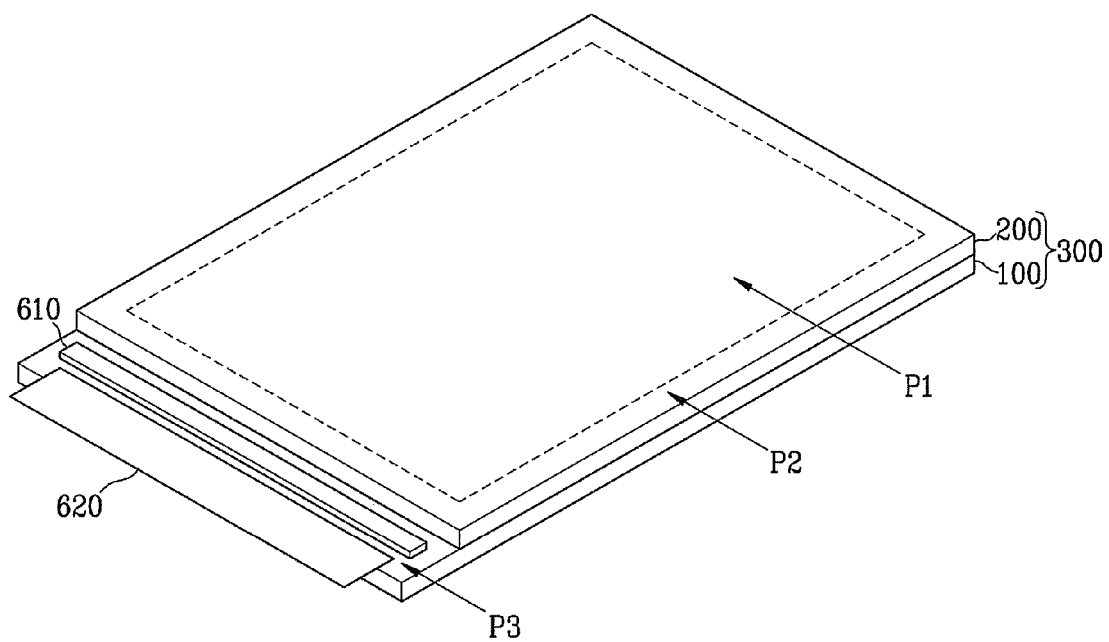
FIG. 5 is a schematic diagram of an exemplary LCD according to an exemplary embodiment of the present invention.

FIG. 1 is a block diagram of an exemplary LCD shown in view of pixels according to an exemplary embodiment of the present invention. FIG. 2 is an equivalent circuit diagram of an exemplary pixel of an exemplary LCD according to an exemplary embodiment of the present invention. FIG. 3 is a block diagram of an exemplary LCD showing exemplary sensing units according to an exemplary embodiment of the present invention. FIGS. 4A and 4B are equivalent circuit diagrams of sensing units of exemplary LCDs according to exemplary embodiments of the present invention, respectively. Also, FIG. 5 is a schematic diagram of an exemplary LCD according to an exemplary embodiment of the present invention.

As shown in FIGS. 1 and 3, an exemplary LCD includes a liquid crystal ("LC") panel assembly 300, an image scanning driver 400, an image data driver 500, a sensing signal processor 800, a gray voltage generator 550 coupled to the image data driver 500, a touch determiner 700 coupled to the sensing signal processor 800, and a signal controller 600 for controlling the above-referenced elements as described further herein.

Referring to FIGS. 1 to 4B, the LC panel assembly 300, in an equivalent circuital view, includes a plurality of signal lines $G_1$-$G_n$ and $D_1$-$D_m$, a plurality of pixels PX, a plurality of sensor signal lines $SY_1$-$SY_N$, $SX_1$-$SX_M$, and RL, and a plurality of sensing units SU. The pixels PX are connected to the signal lines $G_1$-$G_n$ and $D_1$-$D_m$ and are arranged substantially in a matrix configuration. The sensing units SU are connected to the sensor signal lines $SY_1$-$SY_N$, $SX_1$-$SX_M$ and RL and are arranged substantially in a matrix configuration. The panel assembly 300, in a structural view shown in FIGS. 2 and 5, includes a thin film transistor ("TFT") array panel 100, a common electrode panel 200, an LC layer 3 interposed therebetween, and a plurality of spacers (not shown). The spacers form a gap between the panels 100 and 200 and are transformed by pressure applied from the outside. A distance between the panels 100 and 200 is defined as the cell gap.

The signal lines $G_1$-$G_n$ and $D_1$-$D_m$ include a plurality of image scanning lines $G_1$-$G_n$, also known as gate lines, for transmitting image scanning signals and a plurality of image data lines $D_1$-$D_m$, also known as source lines, for transmitting image data signals.

The sensor signal lines $SY_1$-$SY_N$, $SX_1$-$SX_M$ and RL include a plurality of horizontal and vertical sensor scanning lines $SY_1$-$SY_N$ and $SX_1$-$SX_M$, respectively, for transmitting sensor data signals and a plurality of reference voltage lines RL for transmitting reference voltages. The reference voltage lines RL may be omitted if necessary.

As shown in FIGS. 1 and 3, the image scanning lines $G_1$-$G_n$ and the horizontal sensor data lines $SY_1$-$SY_N$ extend substantially in a row direction, a first direction, and are substantially parallel to each other, while the image data lines $D_1$-$D_m$ and the vertical sensor data lines $SX_1$-$SX_M$ extend substantially in a column direction, a second direction, and are substantially parallel to each other. The first direction and the second direction are substantially perpendicular to each other. The reference voltage lines RL extend substantially in the row direction or in the column direction.

Referring to FIG. 2, each pixel PX, for example, a pixel PX in the i-th row (i=1, 2, . . . , n) and the j-th column (j=1, 2, . . . , m), is connected to signal lines $G_i$ and $D_j$ and includes a switching element Q connected to the signal lines $G_1$-$G_n$ and $D_1$-$D_m$, and an LC capacitor $C_{LC}$ and a storage capacitor $C_{ST}$ that are connected to the switching element Q. However, it will be understood that the storage capacitor CST may be omitted.

The switching element Q, such as a TFT, is provided on the lower panel 100 and has three terminals: a control terminal, such as a gate electrode, connected to one of the image scanning lines $G_1$-$G_n$; an input terminal, such as a source electrode, connected to one of the image data lines $D_1$-$D_m$; and an output terminal, such as a drain electrode, connected to the LC capacitor $C_{LC}$ and the storage capacitor $C_{ST}$. At this time, the TFT may be made of amorphous silicon ("a-Si") or poly crystalline silicon.

The LC capacitor $C_{LC}$ includes a pixel electrode 191 provided on the TFT array panel 100 and a common electrode 270 provided on the common electrode panel 200, as two terminals. The LC layer 3 disposed between the two electrodes 191 and 270 functions as a dielectric of the LC capacitor $C_{LC}$. The pixel electrode 191 is connected to the switching element Q, and the common electrode 270 is supplied with a common voltage Vcom and covers an entire surface or substantially an entire surface of the common electrode panel 200. While shown on the common electrode panel 200 in FIG. 2 for illustrative purposes, it will be understood that the common electrode 270 may alternatively be provided on the TFT array panel 100, and in which case both electrodes 191 and 270 may have shapes comprising, e.g., bars or stripes.

The storage capacitor $C_{ST}$ is an auxiliary capacitor for the LC capacitor $C_{LC}$. The storage capacitor $C_{ST}$ includes the pixel electrode 191 and a separate signal line (not shown) such as a storage electrode line, which is provided on the lower panel 100, overlaps the pixel electrode 191 via an insulator (not shown), and is supplied with a predetermined voltage such as the common voltage Vcom. In alternative embodiments, the storage capacitor $C_{ST}$ includes the pixel electrode 191 and an adjacent image scanning line (one of $G_1$-$G_n$), called a previous image scanning line, which overlaps the pixel electrode 191 via an insulator.

For color display, each pixel PX uniquely represents one of various colors (i.e., spatial division) or each pixel PX sequentially represents the colors (e.g., primary colors) in turn (i.e., temporal division) such that a spatial or temporal sum of the colors is recognized as a desired color. An example of a set of the colors includes the colors of red, green, and blue. FIG. 2 shows an example of the spatial division in which each pixel PX includes a color filter 230 representing one of the colors in an area of the common electrode panel 200 facing the pixel electrode 191. In alternative exemplary embodiments, the color filter 230 is provided on or under the pixel electrode 191 on the TFT array panel 100.

One or more polarizers (not shown) may be attached to at least one of the panels 100 and 200. A first polarized film and a second polarized film may be disposed on the TFT array panel 100 and the common electrode panel 200, respectively. The first and second polarized films adjust a transmission direction of light externally provided into the TFT array panel 100 and the common electrode panel 200, respectively, in accordance with an aligned direction of the LC layer 3. The first and second polarized films have first and second polarized axes thereof substantially perpendicular to each other, respectively.

Each of the sensing units SU may have one of the structures shown in FIGS. 4A and 4B.

A sensing unit SU1 shown in FIG. 4A includes a variable capacitor Cv connected to a horizontal or vertical sensor data line that is represented as a drawing reference "SL", and a reference capacitor Cp connected between the sensor data line SL and a reference voltage line RL.

The reference capacitor Cp is formed between the reference voltage line RL and the sensor data line SL, both of the TFT array panel 100, via an insulator.

The variable capacitor Cv includes the sensor data line SL of the TFT array panel 100 and the common electrode 270 provided on the common electrode panel 200 as two terminals and an LC layer 3 interposed therebetween, which functions as an insulator. The capacitance of the variable capacitor Cv varies by an external stimulus such as a touch of a user, which is applied to the LC panel assembly 300. An example of the external stimulus is pressure, and when the pressure is applied to the common electrode panel 200, the distance between the two terminals of the variable capacitor Cv, by pressed-variation of the spacers, is altered to vary the capacitance of the variable capacitor Cv.

By the variation of the capacitance of the variable capacitor Cv, a touch voltage Vn of a touch point between the reference capacitor Cp and the variable capacitor Cv is varied.

The touch voltage Vn flows through the sensor data line SL as a sensor data signal, and whether touch is made or not is determined based on the touch voltage Vn. At this time, since the reference capacitor Cp has a predetermined capacitance and the reference voltage from the reference voltage line RL applied to the reference capacitor Cp is also fixed, the touch voltage Vn is varied within a constant range. Thereby, the sensor data signal flowing through the sensor data line SL is varied within the constant range, and whether touch is made, and, if so, a touch position is easily determined.

A sensing unit SU2 shown in FIG. 4B includes a switch SWT connected to the sensor data line SL. The switch SWT includes the common electrode 270 of the common electrode panel 200 and the sensor data line SL of the TFT array panel 100 as two terminals. At least one of the two terminals is projected, and thereby the two terminals are physically and electrically connected to each other by touch of a user. Thereby, the common voltage Vcom from the common electrode panel 200 is outputted to the sensor data line SL as a sensor data signal. When the sensing unit SU2 is applied, the reference voltage line RL shown in FIG. 4A may be omitted.

By analyzing the sensor data signals from the horizontal sensor data lines $SY_1$-$SY_N$, a Y-coordinate of a touch point may be determined, and by analyzing the sensor data signals from the vertical sensor data lines $SX_1$-$SX_M$, an X-coordinate of the touch point may be determined.

One sensing unit SU is disposed in two adjacent pixels PX. A concentration of a pair of the sensing units SU connected to the horizontal and vertical sensor data lines $SY_1$-$SY_N$ and $SX_1$-$SX_M$, respectively, and disposed adjacent to an intersected area of the corresponding sensor data lines $SY_1$-$SY_N$ and $SX_1$-$SX_M$, may be, for example, about ¼ of the concentration of the "dots", where the term "dot" includes a set of different colored pixels PX and is the basic unit for representing a color and determining the resolution of the LCD. The set of pixels PX may includes a red pixel, a green pixel, and a blue pixel sequentially arranged in a row. Alternatively, the set of pixels PX may include a red pixel, a green pixel, a blue pixel, and a white pixel.

As an example of the pair of the sensing units SU having about ¼ concentration of the concentration of the dots, concentrations in horizontal and vertical directions of the sensing units SU are about half compared with concentration of horizontal and vertical directions of the pixels PX, respectively. In this case, there may be pixel rows and pixel columns without the sensing units SU.

An LCD having the concentration of sensing units SU and dots as above-described may be utilized in various application fields requiring high letter recognition and accuracy. The concentration of sensing units SU may be varied if necessary. For example, the concentration of sensing units SU may be more or less than the above-described ¼ concentration of the concentration of the dots.

By the sensing units SU according to an exemplary embodiment of the present invention, space occupied by the sensing units SU and the sensor data lines SL is relatively less as compared to pixels PX, and thereby an aperture decrement is minimized. That is, a decrease of the aperture ratio of the LC panel assembly 300 is minimized.

Referring again to FIGS. 1 and 3, the gray voltage generator 550 generates two sets of gray voltages (or reference gray voltages) related to a transmittance of the pixels PX. The gray voltages in the first set have a positive polarity with respect to the common voltage Vcom, while the gray voltages in the second set have a negative polarity with respect to the common voltage Vcom.

The image scanning driver 400 in FIG. 1 is connected to the image scanning lines $G_1$-$G_n$ of the panel assembly 300, and synthesizes a first high voltage and a first low voltage to generate the image scanning signals, such as a gate-on voltage Von and a gate-off voltage Voff, for application to the image scanning lines $G_1$-$G_n$.

The image data driver 500 in FIG. 1 is connected to the image data lines $D_1$-$D_m$ of the panel assembly 300 and applies image data signals selected from the gray voltages to the image data lines $D_1$-$D_m$. However, it will be understood that the image data driver 500 may generate gray voltages for both sets of gray voltages by dividing the reference gray voltages and selecting the data voltages from the generated gray voltages when the gray voltage generator 550 generates reference gray voltages.

As shown in FIG. 3, the sensing signal processor 800 receives sensor data control signals CONT3 from the signal controller 600. The sensing signal processor 800 is connected to the sensor data lines $SY_1$-$SY_N$ and $SX_1$-$SX_M$ of the LC panel assembly 300 and provided with the sensor data signals through the sensor data lines $SY_1$-$SY_N$ and $SX_1$-$SX_M$. After signal processing such as the amplifying and the filtering, etc., the sensing signal processor 800 converts the analog processed sensor data signals into digital sensor data signals to generate digital sensing signals DSN.

The touch determiner 700 is provided with the digital sensing signals DSN from the sensing signal processor 800, processes predetermined operations to determine whether touch is made, and if so, a touch position is output to an external device as touch information INF. The touch determiner 700 may sense operations of the sensing units SU based on the digital sensing signals DSN and control control signals applied to the sensing units SU.

The signal controller 600 controls the image scanning driver 400, the image data driver 500, the gray voltage generator 550, and the sensing signal processor 800, etc.

Referring to FIGS. 1 and 3, each of the aforementioned units 400, 500, 550, 600, 700, and 800 may include at least one integrated circuit ("IC") chip mounted on the LC panel assembly 300 or on a flexible printed circuit ("FPC") film as a tape carrier package ("TCP") type, which are attached to the panel assembly 300. In alternative embodiments, at least one of the units 400, 500, 550, 600, 700, and 800 may be integrated with the panel assembly 300 along with the signal lines $G_1$-$G_n$, $D_1$-$D_m$, $SY_1$-$SY_N$, and $SX_1$-$SX_M$ and the switching elements Q.

Referring to FIG. 5, the LC panel assembly 300 is divided into a display area P1, a periphery area P2, and an exposed area P3. Most of pixels PX, the sensing units SU, and signal lines $G_1$-$G_N$, $D_1$-$D_m$, $SY_1$-$SY_N$, and $SX_1$-$SX_M$ are mainly disposed in the display area P1. The common electrode panel 200 includes a black matrix (not shown), and the black matrix substantially covers the periphery area P2 to block light from the outside. A size of the common electrode panel 200 is less than that of the TFT array panel 100 such that portions of the TFT array panel 100 are exposed to form the exposed area P3. A single chip 610 is mounted onto the exposed area P3 and a flexible printed circuit board ("FPC") substrate 620 is attached thereon.

The single chip 610 includes operating units, such as the image scanning driver 400, the image data driver 500, the gray voltage generator 550, the signal controller 600, the touch determiner 700, and the sensing signal processor 800. The units 400, 500, 550, 600, 700, and 800 may be integrated into the single chip 610, to decrease the occupied size of the units 400, 500, 550, 600, 700, and 800 and consumption power. If necessary, at least one of the units 400, 500, 550, 600, 700, 800, and 900 or at least one circuit element of at least one of the units 400, 500, 550, 600, 700, 800, and 900 may be disposed outside of the single IC chip 610.

The image signal lines $G_1$-$G_N$ and $D_1$-$D_m$ and the sensor data lines $SY_1$-$SY_N$ and $SX_1$-$SX_M$ extend to the exposed area P3 and are connected to the corresponding units 400, 500, and 800.

The FPC substrate 620 receives signals from an external device and transmits the signals to the single chip 610 or LC panel assembly 300. The FPC substrate 620 may include connectors for easily touching to the external device at end portions thereof.

Operation of the LCD will now be described in accordance with exemplary embodiments.

The signal controller 600 is supplied with input image signals R, G, and B and input control signals for controlling the display thereof from an external graphics controller (not shown). The input image signals R, G, and B contain luminance information of each pixel PX, and the luminance has a predetermined number of grays, for example, 1024 ($=2^{10}$), 256 ($=2^8$), or 64 ($=2^6$). The input control signals include a vertical synchronization signal Vsync, a horizontal synchronization signal Hsync, a main clock signal MCLK, a data enable signal DE, etc.

On the basis of the input control signals and the input image signals R, G, and B, the signal controller 600 generates image scanning control signals CONT1, image data control signals CONT2, and sensor data control signals CONT3, and it processes the image signals R, G, and B into processed image signals DAT to be suitable for the operation of the panel assembly 300. The signal controller 600 sends the image scanning control signals CONT1 to the image scanning driver 400, the processed image signals DAT and the image data control signals CONT2 to the image data driver 500, and the sensor data control signals CONT3 to the sensing signal processor 800.

The image scanning control signals CONT1 include an image scanning start signal STV for instructing an image scanning start operation and at least one clock signal for controlling the output time of the first high voltage, such as Von which may be from a voltage generator (not shown). The image scanning control signals CONT1 may include an output enable signal OE for defining the duration of the first high voltage.

The image data control signals CONT2 include a horizontal synchronization start signal STH for informing a start of image data transmission for a group of pixels PX, a load signal LOAD for instructing application of the image data signals to the image data lines $D_1$-$D_m$, and a data clock signal HCLK. The image data control signals CONT2 may further include an inversion signal RVS for reversing the polarity of the image data signals (e.g., with respect to the common voltage Vcom).

Responsive to the image data control signals CONT2 from the signal controller 600, the image data driver 500 receives a packet of the digital image data DAT for the group of pixels PX from the signal controller 600 and receives one of the two sets of the gray voltages supplied from the gray voltage generator 550. The image data driver 500 converts the processed image signals DAT into analog image data voltages selected from the gray voltages supplied from the gray voltage generator 550, and applies the image data voltages to the image data lines $D_1$-$D_m$.

The image scanning driver 400 applies a gate-on voltage Von to the image scanning lines $G_1$-$G_n$ in response to receiving the image scanning control signals CONT1 from the signal controller 600, thereby turning on the switching elements Q connected thereto. The image data voltages applied to the image data lines $D_1$-$D_m$ are supplied to the pixels PX through the activated switching elements Q. Gate-off voltage Voff applied to the image scanning lines $G_1$-$G_n$ via the image scanning driver 400 turns off the switching elements Q connected thereto.

A difference between the voltage of an image data signal and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts light polarization into light transmittance to display images.

By repeating this procedure by a unit of a horizontal period (also referred to as "1 H", which is equal to one period of the horizontal synchronization signal Hsync and the data enable signal DE), all image scanning lines $G_1$-$G_N$ are sequentially supplied with the first high voltage, thereby applying the image data signals to all pixels PX via the image data lines $D_1$-$D_m$ to display an image for a frame.

When the next frame starts after one frame finishes, the inversion control signal RVS applied to the image data driver 500 is controlled such that the polarity of the data voltages is reversed (which is referred to herein as "frame inversion"). The inversion control signal RVS may also be controlled such that the polarity of the image data signals flowing in an image data line is periodically reversed during one frame (for example, row inversion and dot inversion), or the polarity of the image data signals in one packet is reversed (for example, column inversion and dot inversion).

The sensing signal processor 800 reads the sensor data signals, as provided by touch voltages Vn, through the sensor data lines $SY_1$-$SY_N$, and $SX_1$-$SX_M$ in a porch period between two adjacent frames, in accordance with the sensor data control signals CONT3 from the signal controller 600, every frame. This is to decrease the influence of driving signals from the image scanning driver 400 and the image data driver 500, etc., on sensor data signals, such that reliability of the sensor data signals is increased. However, the reading of the sensor data signals by the sensing signal processor 800 is not necessarily performed every frame, and if necessary, it may be performed for a plurality of frames.

Then, as will be further described below, the sensing signal processor 800 processes, for example, amplifies and filters, etc., the read sensor data signals from the sensor data lines $SY_1$-$SY_N$, and $SX_1$-$SX_M$ and converts them into digital sensing signals DSN to output to the touch determiner 700.

The touch determiner 700 suitably operates the received digital sensing signals DSN and determines whether a touch is made, and if so, determines a touch position to output the touch information INF to an external device. The external device transmits the image signals R, G, and B to an LCD based on the touch information INF from the touch determiner 700.

Next, exemplary operations of an LCD using the sensing unit SU1 shown in FIG. 4A according to an exemplary embodiment of the present invention will be described with reference to FIGS. 6A through 7B.

Figure 6A:
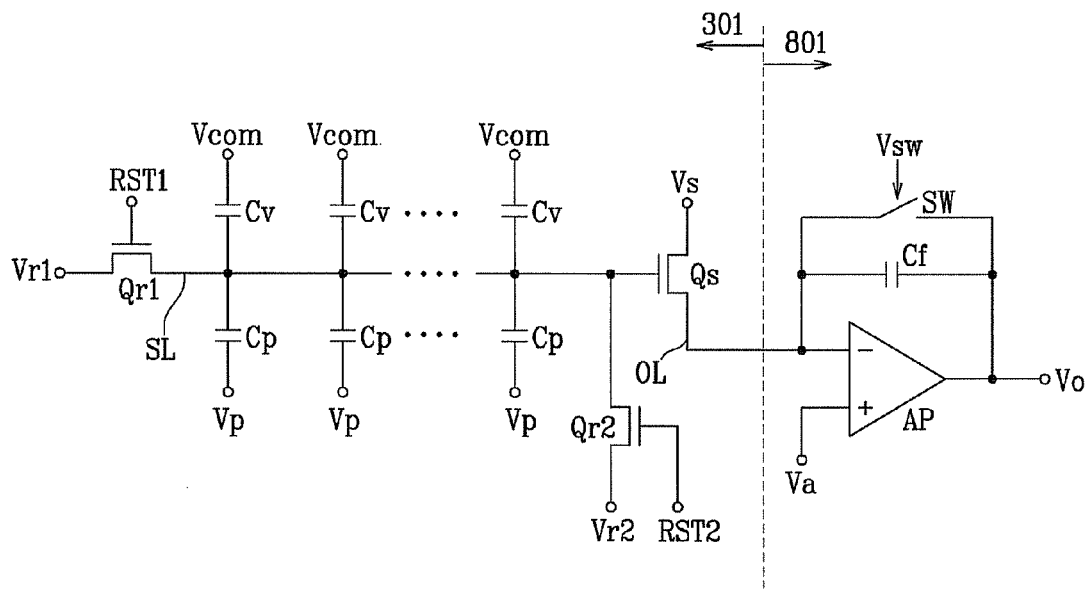
FIG. 6A is an equivalent circuit diagram of a plurality of exemplary sensing units connected to one exemplary sensor data line in an exemplary LCD according to an exemplary embodiment of the present invention.
Figure 6B:
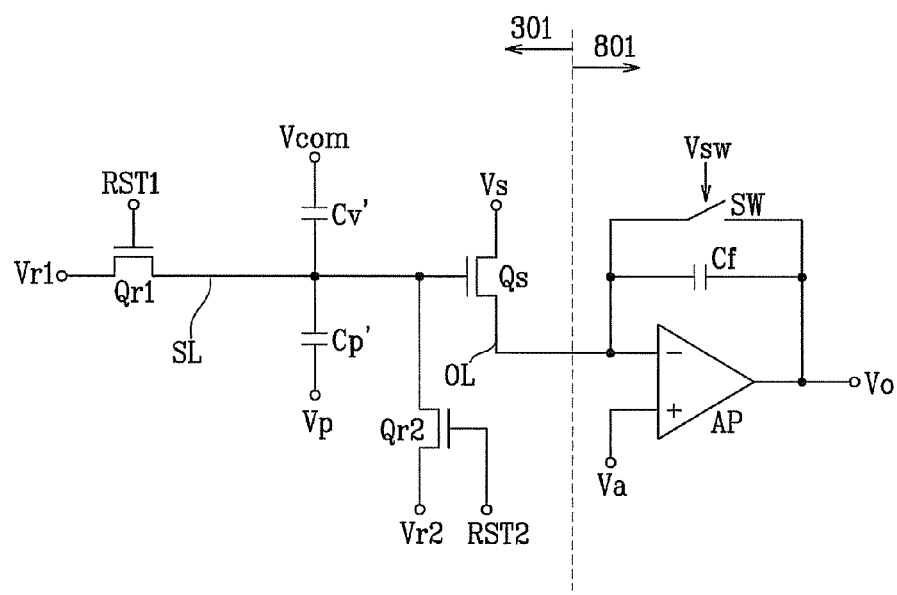
FIG. 6B is an equivalent circuit diagram simply representing the equivalent circuit diagram shown FIG. 6A.
Figure 7A:
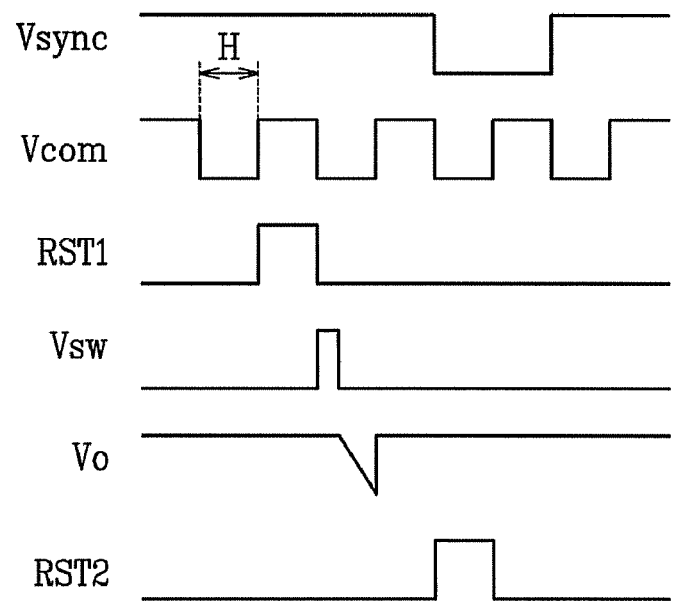
FIGS. 7A and 7B are timing charts for an exemplary sensing operation of an exemplary LCD according to an exemplary embodiment of the present invention.
Figure 7B:
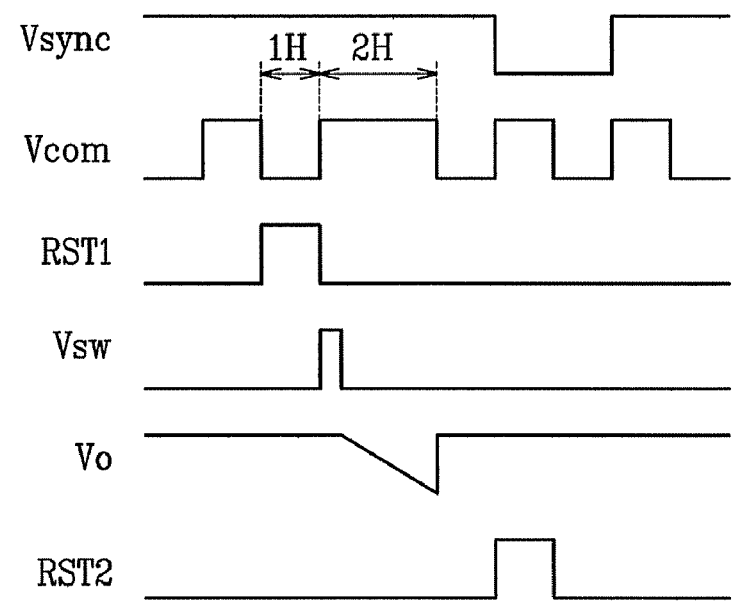

FIG. 6A is an equivalent circuit diagram of a plurality of exemplary sensing units connected to one exemplary sensor data line in an exemplary LCD according to an exemplary embodiment of the present invention, FIG. 6B is an equivalent circuit diagram simply representing the equivalent circuit diagram shown FIG. 6A, and FIGS. 7A and 7B are timing charts for an exemplary sensing operation of an exemplary LCD according to an exemplary embodiment of the present invention.

Referring to FIGS. 6A and 6B, an LC panel assembly 301 according to an exemplary embodiment of the present invention includes a plurality of sensor data lines SL like those shown in FIG. 3, a plurality of sensing units SU1 connected to the sensor data lines SL, respectively, a plurality of first and second reset transistors Qr1 and Qr2, a plurality of output transistors Qs, and a plurality of output data lines OL connected to the output transistors Qs. For each sensor data line SL, a plurality of sensing units SU1 are connected thereto, and each of the sensing units SU1 includes a variable capacitor Cv and a reference capacitor Cp. Also for each sensor data line SL, one first reset transistor Qr1, one second reset transistor Qr2, and one output transistor Qs are connected to different end portions of the sensor data line SL, respectively. The variable capacitors Cv are connected to the common voltage Vcom from the common electrode 270, and the reference capacitors Cp are connected to a reference voltage Vp from the reference voltage line RL. Meanwhile, the sensing signal processor 801 includes an amplifier AP, a capacitor Cf, and a switch SW.

As described above, the plurality of variable capacitors Cv includes the sensor data lines SL and the common electrode 270 as two terminals. The plurality of variable capacitors Cv may be represented by one variable capacitor Cv' shown in FIG. 6B, and the capacitance of the variable capacitor Cv' is practically uniformly distributed along one sensor data line SL. Moreover, as shown in FIG. 6B, the plurality of reference capacitors Cp may be represented by one reference capacitor Cp' corresponding to the variable capacitor Cv'.

The first and second reset transistors Qr1 and Qr2 have three terminals: control terminals connected to the first and second reset signals RST1 and RST2, respectively, input terminals connected to the first and second reset voltages Vr1 and Vr2, respectively, and output terminals connected to a sensor data line SL. The first and second reset transistors Qr1 and Qr2 are disposed on the periphery area P2 of the LC panel assembly 301 and supply the first and second reset voltages Vr1 and Vr2 to the sensor data line SL in response to the first and second reset signals RST1 and RST2. The first reset transistors Qr1 are located at first ends of the sensor data lines SL, and the second reset transistors Qr2 are located at second ends of the sensor data lines SL.

The output transistor Qs has three terminals: a control terminal connected to the sensor data line SL, input terminals connected to an input voltage Vs, and an output terminal connected to an output data line OL. The output transistors Qs are also disposed on the periphery area P2 of the LC panel assembly 301, and they generate an output signal based on the sensor data signal flowing through the sensor data line SL. The output signal may be a current, but alternatively, it may be a voltage.

The first reset transistor Qr1, the second reset transistor Qr2, and the output transistor Qs may be formed as TFTs on the TFT array panel 100 within the same layers as the switching element Q, thus preventing an increase in thickness of the LC panel assembly 301.

The output data line OL is connected to the amplifier AP of the sensing signal processor 801.

The amplifier AP includes an inverting terminal (−), a non-inverting terminal (+), and an output terminal. The output data line OL is connected to the inverting terminal (−), and the capacitor Cf and the switch SW are connected between the inverting terminal (−) and the output terminal of the amplifier AP. A switching signal Vsw may be applied to the switch SW, to discharge a charged voltage in the capacitor Cf. A reference voltage Va is connected to the non-inverting terminal (+). The amplifier AP and the capacitor Cf function as a current integrator, to integrate output current from the output transistor Qs for a predetermined time and generate a sensing signal Vo.

Referring to FIG. 7A, an LCD according to an exemplary embodiment of the present invention reads sensing signals in the porch period between two adjacent frames as described above, and in particular, preferably in a front porch period before the vertical synchronization signal Vsync.

The common voltage Vcom has a high level and a low level, and swings between the high level and the low level by about 1 H.

The first and second reset signals RST1 and RST2 have a gate-on voltage Von and a gate-off voltage Voff for turning on and turning off the transistors RST1 and RST2, respectively. The gate-on voltage Von of the first reset signal RST1 is applied when the common voltage Vcom has a high level, and may be applied for about "1 H". When the gate-on voltage Von of the first reset signal RST1 is applied to the first reset transistor Qr1, the first reset voltage Vr1 is applied to the sensor data line SL to initialize the state of the sensor data line SL.

Then, when the first reset signal RST1 has the gate-off voltage Voff, the state of the sensor data line SL is floated, and thereby the sensor data signal is varied based on the capacitance variation of the variable capacitor Cv' and the variation of the common voltage Vcom. Meanwhile, after the state of the first reset signal RST1 is changed from the gate-on voltage Von into the gate-off voltage Voff, the switching signal Vsw is applied to the switch SW, to discharge a charged voltage in the capacitor Cf. Then, when a predetermine time lapses, the sensing signal processor 801 reads a sensing signal Vo. At this time, preferably, the sensing signal Vo is read within about "1 H" after the state of the first reset signal RST1 is changed into the gate-off voltage Voff. That is, preferably, the sensing signal Vo is read before the common voltage Vcom has a high level again.

Since the sensor data signal is varied based on the first reset voltage Vr1, the sensor data signal has a constant voltage range, and thereby whether touch is made, and if so, a touch position are easily determined.

After the sensing signal processor 801 reads the sensing signal Vo, the state of the second reset signal RST2 is changed form the gate-off voltage Voff into the gate-on voltage Von to turn on the second reset transistor Qr2. Thereby, the second reset voltage Vr2 is applied to the sensor data line SL, and thereby the state of the sensor data line SL becomes the second reset voltage Vr2. The second reset voltage Vr2 is maintained until the next first reset voltage Vr1 is applied to the sensor data line SL. The second reset voltage Vr2 and the common voltage Vcom generate electric fields in an LC layer 3 between the sensor data line SL and the common electrode 270. LC molecules of the LC layer 3 have orientations (inclination directions) defined depending on the generated electric fields. The variation amount of the sensor data signal is varied based on the orientations of the LC molecules, and thereby the variation amount of the sensor data signal increases by appropriately defining a value of the second reset voltage Vr2.

In an alternative embodiment, the gate-on voltage Von of the first reset signal RST1 may be applied when the common voltage Vcom has a low level, at this time, and it is preferable that the sensing signal processor 801 reads the sensing signal Vo before the common voltage Vcom has a low level again. Also, the first reset signal RST1 may be synchronized with an image scanning signal applied to the final image scanning line Gn.

The second reset signal RST2 may have a gate-on voltage Von right next to an approximate 1 H or in any subsequent approximate 1 H after the sensing signal Vo is read. For example, the gate-on voltage Von of the second reset signal RST2 may be applied when the common voltage Vcom has a low level.

A timing diagram shown in FIG. 7B is substantially similar to the timing diagram shown in FIG. 7A. However, referring to FIG. 7B, unlike FIG. 7A, the first reset signal RST1 has a gate-on voltage Von when the common voltage Vcom has a low level. That is, the first reset voltage Vr1 may be applied when the common voltage Vcom has a low level. Moreover, the sensing signal processor 801 reads a sensing signal Vo within about 2 H after the first reset signal RST1 has a gate-off voltage Voff. At this time, the common voltage Vcom maintains a high level for about 2 H such that the sensor data signal has a stable value. Thereby, the amplifier AP and the capacitor Cf charge an output current from the output transistor Qs for about 2 H such that the variation width of the sensing signal Vo increases.

Alternatively, the sensing signal processor 801 may read the sensing signal Vo beyond about 2 H after the first reset signal RST1 has a gate-off voltage Voff. At this time, the level of the common voltage Vcom may not be changed corresponding to the reading of the sensing signal processor 801.

Connection relationships of the sensor data lines SL and the sensing signal processor 801 of an LCD according to an exemplary embodiment of the present invention will be described with reference to FIG. 8.

Figure 8:
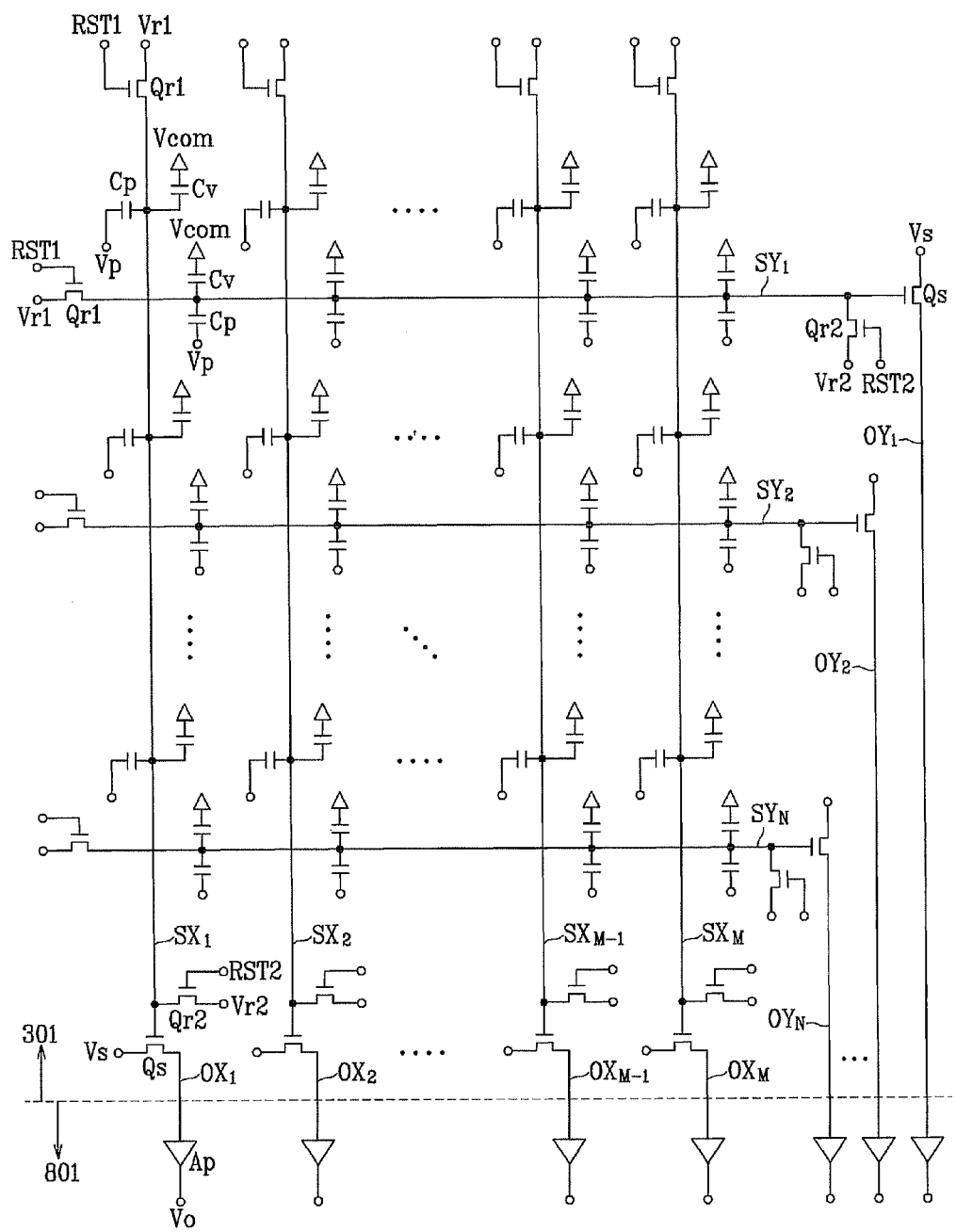
FIG. 8 is an equivalent circuit diagram illustrating an exemplary connection between the exemplary sensor data lines and an exemplary sensing signal processor of an exemplary LCD according to an exemplary embodiment of the present invention.

FIG. 8 is an equivalent circuit diagram illustrating a connection between the exemplary sensor data lines and an exemplary sensing signal processor of an exemplary LCD according to an exemplary embodiment of the present invention.

Referring to FIG. 8, the LC panel assembly 301 includes a plurality of sensor data lines $SY_1$-$SY_N$ and $SX_1$-$SX_M$ and a plurality of sensing units SU1. The LC panel assembly 301 further includes a plurality of first and second reset transistors Qr1 and Qr2 and a plurality of output transistors Qs connected to the sensor data lines $SY_1$-$SY_N$ and $SX_1$-$SX_M$, respectively, and a plurality of horizontal and vertical output data lines $OY_1$-$OY_N$ and $OX_1$-$OX_M$ connected to the sensor data lines $SY_1$-$SY_N$ and $SX_1$-$SX_M$, respectively, through the corresponding output transistors Qs.

The sensing units SU1 are substantially equally disposed to the LC panel assembly 300 shown in FIG. 3. Moreover, the arrangement of the sensor data lines $SY_1$-$SY_N$ and $SX_1$-$SX_M$ connected to the sensing units SU1 is substantially the same as that shown in FIG. 3. Furthermore, operations of the sensing signal processor 801 are substantially equal to those of the sensing signal processor 800 shown in FIG. 3. A display area P1, a periphery area P2, and an exposed area P3 of the LC panel assembly 301 are the same as those of the LC panel assembly 300 shown in FIG. 5. The sensing signal processor 801 is included in a single chip mounted on the exposed area of the LC panel assembly 301, such as single chip 610 mounted in exposed area P3. The single chip further includes a data driver (not shown) as described above, and has terminal arrangement corresponding to terminals of the sensing signal processor 801 and the data driver.

Next, portions that are different from the LC panel assembly 300 shown in FIG. 3 will be further described.

Referring to FIG. 8, the first reset transistors Qr1 are disposed on the upper periphery area of the LC panel assembly 301, and the second reset transistors Qr2 and the output transistors Qs are disposed on the lower periphery area of the LC panel assembly 301. The first reset transistors Qr1 connected to the horizontal sensor data lines $SY_1$-$SY_N$ are disposed on the left periphery area, a first side, of the LC panel assembly 301, and the second reset transistor Qr2 and the output transistors Qs connected to the horizontal sensor data lines $SY_1$-$SY_N$ are disposed on the right periphery area, a second side opposite to the first side, of the LC panel assembly 301. However, if necessary, the second reset transistors Qr2 may be disposed on the same area as the first reset transistors Qr1. Also, as illustrated, the first reset transistors Qr1 connected to the vertical sensor data lines $SX_1$-$SX_M$ may be disposed on the top periphery area, a third side, of the LC panel assembly 301, and the second reset transistor Qr2 and the output transistors Qs connected to the vertical sensor data lines $SX_1$-$SX_M$ may be disposed on the bottom periphery area, a fourth side opposite the third side, of the LC panel assembly 301. That is, although the sizes of the output transistors Qs and the first and second reset transistors Qr1 and Qr2 may be different from each other, the transistors Qs, Qr1, and Qr2 are appropriately disposed on the periphery area P2 of the LC panel assembly 301 to minimize the size of the periphery area P2 of the LG panel assembly 301.

The vertical output data lines $OX_1$-$OX_M$ extend from the bottom periphery area, the fourth side, to the exposed area P3 of the LC panel assembly 301 and are connected to the sensing signal processor 801, and the horizontal output data lines $OY_1$-$OY_N$ extend from the right periphery area, the second side, to the bottom periphery area, the fourth side, of the LC panel assembly 301 and are connected to the sensing signal processor 801 though the exposed area P3 of the LC panel assembly 301. Thus, the vertical output data lines $OX_1$-$OX_M$ 1and the horizontal output data lines $OY_1$-$OY_N$ may extend substantially parallel to each other.

As described above, since a concentration of the pixels PX is different from that of the sensing units SU1, the density of the image data lines $D_1$-$D_m$ and the output data lines $OY_1$-$OY_N$ and $OX_1$-$OX_M$ are different from each other. Each vertical output data line $OX_1$-$OX_M$ is disposed among the plurality of image data lines $D_1$-$D_m$. The horizontal output data lines $OY_1$-$OY_N$ are sequentially disposed on the right portion, the second side, of the LC panel assembly 301, but the image data lines $D_1$-$D_m$ are not disposed between the horizontal output data lines $OY_1$-$OY_N$. When the horizontal output data lines $OY_1$-$OY_N$ are disposed as described above, manufacturing processes of the horizontal output data lines $OY_1$-$OY_N$ become simple and current distortion from the output transistors Qs decreases. The single chip of the LC panel assembly 301 according to the exemplary embodiment of the present invention has a terminal arrangement corresponding to the arrangements of the image data lines $D_1$-$D_m$ and the output data lines $OY_1$-$OY_N$ and $OX_1$-$OX_M$.

The positions of the data lines $D_1$-$D_m$, $OY_1$-$OY_N$, and $OX_1$-$OX_M$ may be varied, that is, the right and the left of the LC panel assembly 301 may be exchanged with each other, and thereby the position of at least one portion of the first and second reset transistors Qr1 and Qr2 connected to the horizontal sensor data lines $SY_1$-$SY_N$, the output transistors Qs, and the horizontal output data lines $OY_1$-$OY_N$ may be changed from the left to the right or from the right to the left. Similarly, the top and the bottom of the LC panel assembly 301 may be exchanged with each other.

Next, an LCD according to another exemplary embodiment of the present invention will be described with reference to FIGS. 9A to 10.

Figure 9A:
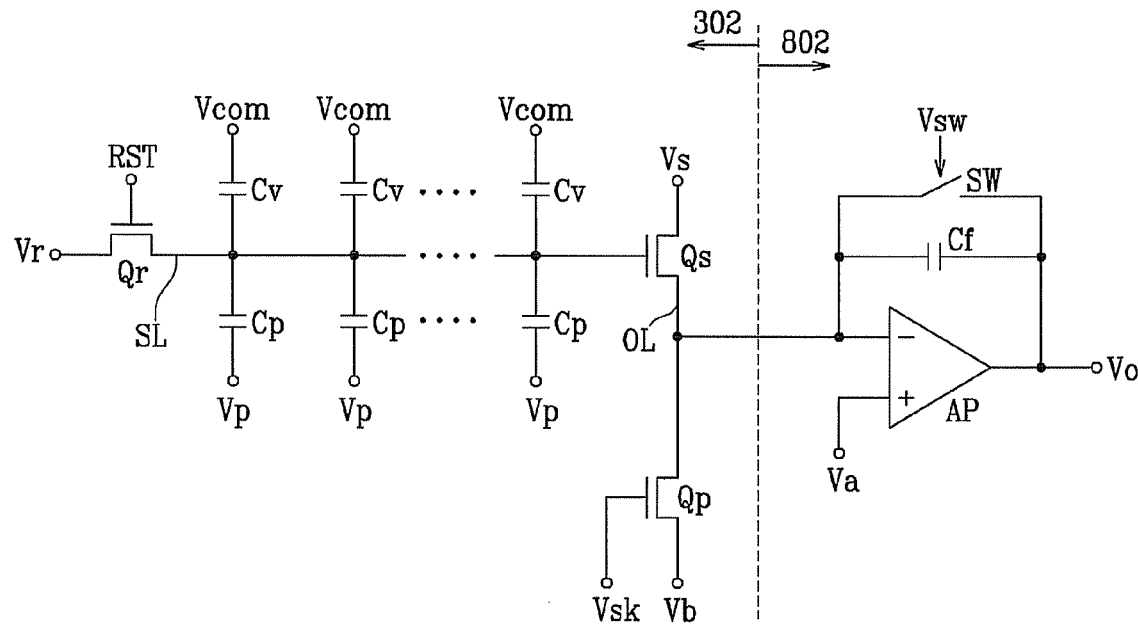
FIG. 9A is an equivalent circuit diagram of a plurality of exemplary sensing units connected to one exemplary sensor data line in an exemplary LCD according to another exemplary embodiment of the present invention.
Figure 9B:
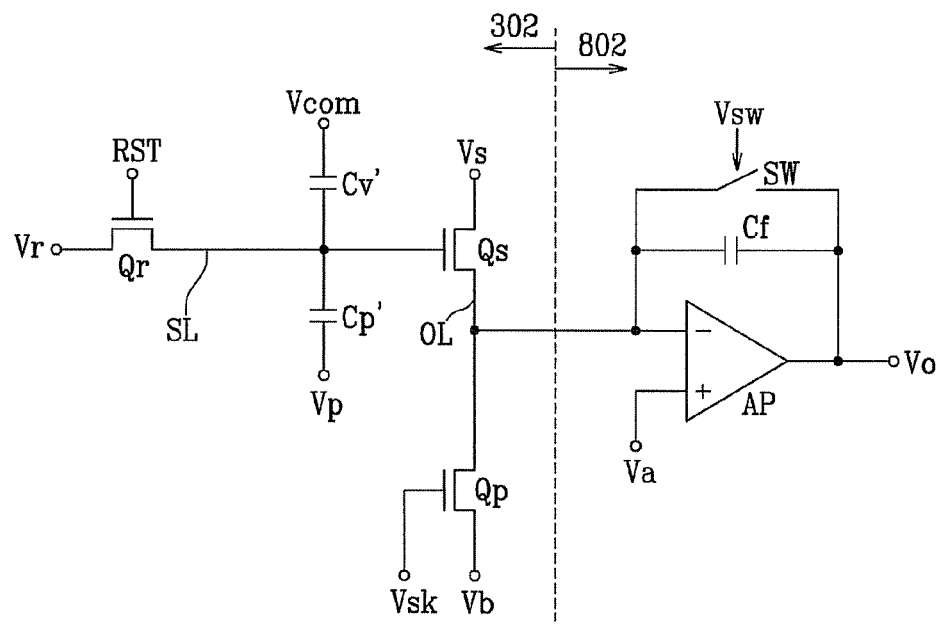
FIG. 9B is an equivalent circuit diagram simply representing the equivalent circuit diagram shown FIG. 9A.
Figure 10:
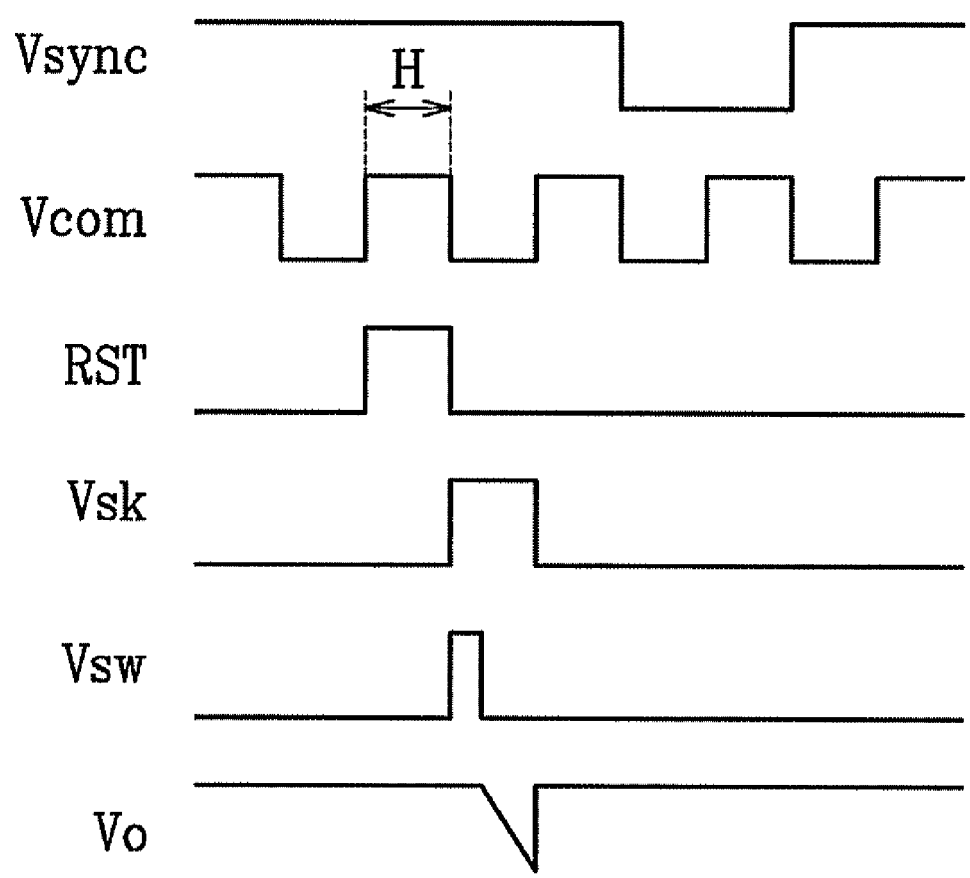
FIG. 10 is a timing chart for an exemplary sensing operation of an exemplary LCD according to another exemplary embodiment of the present invention.

FIG. 9A is an equivalent circuit diagram of a plurality of exemplary sensing units connected to one exemplary sensor data line in an exemplary LCD according to another exemplary embodiment of the present invention, FIG. 9B is an equivalent circuit diagram simply representing the equivalent circuit diagram shown FIG. 9A, and FIG. 10 is a timing chart for an exemplary sensing operation of an exemplary LCD according to another exemplary embodiment of the present invention.

An LC panel assembly 302 of an LCD according to an another exemplary embodiment includes a plurality of sensor data lines SL, each sensor data line SL including a plurality of sensing units SU1 connected thereto and each sensor data line SL further connected to a reset transistor Qr, an output transistor Qs, an output data line OL connected to the output transistor Qs, and a current source transistor Qp. Each sensing unit SU1 includes a variable capacitor Cv and a reference capacitor Cp connected to the respective sensor data line SL, and a reset transistor Qr and an output transistor Qs are connected to the opposite end terminals, respectively, of each sensor data line SL. Meanwhile, the sensing signal processor 802 includes amplifiers AP, capacitors Cf, and a switch SW.

The variable capacitors Cv and the reference capacitors Cp are substantially the same as those of the previous embodiment. Referring to FIG. 9B, the plurality of variable capacitors Cv are represented as one capacitor Cv' and the plurality of reference capacitors Cp are represented as one capacitor Cp'.

The reset transistor Qr is substantially the same as the first reset transistor Qr1 of the previous embodiment, and the output transistor Qs and the sensing signal processor 802 are substantially the same as those of the previous embodiment. Therefore, detailed descriptions thereof are omitted.

The current source transistor Qp, such as a TFT, includes three terminals: a control terminal connected to a current control signal Vsk, an input terminal connected to an input voltage Vb, and an output terminal connected to the output data line OL and an inverting terminal (−) of the amplifier AP. The current source transistors Qp are disposed on a periphery area P2 of the LC panel assembly 302.

A voltage of the inverting terminal (−) of the amplifier AP is the same as that of the non-inverting terminal (+) of the amplifier AP such that a voltage from the output terminal of the current source transistor Qp is substantially the same as a reference voltage Va. When an input voltage Vb of the current source transistor Qp and the current control signal Vsk are defined to have a constant value in a predetermined period, the current source transistor Qp applies a constant current for the predetermined period. Thereby, the current source transistor Qp functions to subtract a constant amount from an output current from the output transistor Qs. Based on the subtracted output current, the amplifier AP and the capacitor Cf generate a sensing signal Vo. As the magnitude of an input signal Vs applied to the control terminal of the output transistor Qs becomes larger, the output current from the output transistor Qs increases, and thereby the variation amount of the output current in accordance with touch and non-touch increases. Accordingly, it is preferable to enlarge the reset voltage Vr.

When the output current increases without the current source transistor Qp, an operating area of the amplifier AP increases, and thereby power consumption increases and the size of the amplifier AP increases. However, as described above, in the case that the constant current amount is subtracted from the output current of the output transistor Qs by the current source transistor Qp, the operating area of the amplifier AP relatively decreases, and thereby the power consumption and the size of the amplifier AP significantly decrease. In this case, the variation of a current applied to the amplifier AP is substantially equal to that of a current outputted from the output transistor Qs, so as to not influence a touch determination.

The timing diagram shown in FIG. 10 is similar to that shown in FIG. 7A. Referring to FIG. 10, sensing signals Vo are read in the porch period, and in particular, preferably in a front porch period before the vertical synchronization signal Vsync, as described above.

A gate-on voltage Von of a reset signal RST is applied to the reset transistor Qr when the common voltage Vcom is a high level. By application of the gate-on voltage Von, a reset voltage Vr is applied to the sensor data line SL, to initialize the sensor data line SL.

A current control signal Vsk has a high voltage to make the current source transistor Qp flow a constant current from input voltage Vb, and a low voltage to make the current source transistor Qp substantially block the flow of the constant current. When a state of the reset signal RST is a gate-off voltage Voff, a switching signal Vsw is applied to the switch SW, and a state of the current control signal Vsk is a high voltage. Then, when a predetermined time lapses, the sensing signal processor 802 reads a sensing signal Vo, and then the state of the current control signal Vsk is changed into a low voltage state. Since the current control signal Vsk maintains the high voltage in the predetermined time, and thereby the constant current flows through the current source transistor Qp, the power consumption decreases.

Various features of the LCD described with reference to FIGS. 6A to 8 may be applied to the LCD shown in FIGS. 9A to 10. Alternatively, the current source transistor Qp shown in FIG. 9A may be included in the LC panel assembly 301 shown in FIG. 6A, and many features according to the current source transistor Qp may be applied to the LCD described above. Also, the sensing unit SU2 as described with respect to FIG. 4B may be applied to any of the above-described LCDs.

According to the present invention, an LC panel assembly includes sensing units having variable capacitors or switches, etc., and thereby whether touch is made with the LC panel assembly, and if so, a touch position are easily determined based on the pressure applied to the LC panel assembly.

While the present invention has been described in detail with reference to the exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first panel;
   a second panel facing and separated from the first panel;
   a liquid crystal layer interposed between the first and second panels;
   a plurality of sensor data lines formed on the second panel;
   a plurality of variable capacitors of which capacitance thereof is varied by pressure, the variable capacitors connected to the sensor data lines;
   a plurality of reference capacitors connected to the sensor data lines;
   first reset transistors and second reset transistors connected to the sensor data lines and supplying a first reset voltage and a second reset voltage to the sensor data lines at different times, respectively;
   a plurality of output transistors connected to the sensor data lines and generating output signals based on sensor data signals flowing through the sensor data lines; and
   a sensing signal processor supplied with the output signals from the output transistors and generating sensing signals based on the output signals,
   wherein the variable capacitors comprise first capacitance electrodes formed on the first panel and second capacitance electrodes formed on the second panel, and the sensor data lines function as the second capacitance electrodes; and
   wherein the first reset transistors apply the first reset voltage to the sensor data lines before the sensing signal processor generates the sensing signals.

2. The liquid crystal display of claim 1, wherein the output transistors are disposed on a periphery area of the second panel.

3. The liquid crystal display of claim 1, wherein the sensing signal processor further comprises integrators integrating the output signals to generate the sensing signals.

4. The liquid crystal display of claim 3, wherein the integrators comprise amplifiers and capacitors.

5. The liquid crystal display of claim 1, further comprising current sources connected to the output transistors and the sensing signal processor, the current sources each flowing a constant current.

6. The liquid crystal display of claim 5, wherein the current sources comprise thin film transistors flowing the constant current while the sensing signal processor generates the sensing signals.

7. The liquid crystal display of claim 1, wherein the first reset transistors and the second reset transistors are formed on a periphery area of the second panel.

8. The liquid crystal display of claim 1, wherein a distance between the first capacitance electrode and the second capacitance electrode for each variable capacitor is varied by pressure and the capacitance of each variable capacitor is varied based on a distance variation.

9. The liquid crystal display of claim 1, wherein the reference capacitors are supplied with a reference voltage.

10. The liquid crystal display of claim 1, wherein the first capacitance electrodes are supplied with a common voltage swinging between a first level and a second level.

11. The liquid crystal display of claim 10, wherein the sensing signal processor generates the sensing signals in a porch period between frames.

12. The liquid crystal display of claim 10, wherein the sensing signal processor generates the sensing signals within a predetermined time after the first reset transistors are turned off.

13. The liquid crystal display of claim 12, wherein the common voltage maintains one of the first level and the second level for the predetermined time.

14. The liquid crystal display of claim 13, wherein the predetermined time is at least about 1 H.

15. The liquid crystal display of claim 1, wherein the sensor data lines comprise a plurality of first and second sensor data lines extending in directions different from each other, respectively.

16. The liquid crystal display of claim 1, wherein the second reset transistors apply the second reset voltage to the sensor data lines after the sensing signal processor generates the sensing signals.

* * * * *